US012797869B2

(12) United States Patent
Kenzo Huziwara et al.

(10) Patent No.: US 12,797,869 B2
(45) Date of Patent: Nov. 17, 2026

(54) THIRD-STAGE SYSTEM WITH AUTOMATIC BLEEDING, AND USE THEREOF

(71) Applicant: Petróleo Brasileiro S.A.—Petrobras, Rio de Janeiro (BR)

(72) Inventors: Wilson Kenzo Huziwara, Rio de Janeiro (BR); Rafael Diego Graczyk, São Mateus do Sul (BR); Emanuel Freire Sandes, São José dos Campos (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 490 days.

(21) Appl. No.: 18/006,014

(22) PCT Filed: Jul. 19, 2021

(86) PCT No.: PCT/BR2021/050305
§ 371 (c)(1),
(2) Date: Jan. 19, 2023

(87) PCT Pub. No.: WO2022/016248
PCT Pub. Date: Jan. 27, 2022

(65) Prior Publication Data

US 2023/0294114 A1 Sep. 21, 2023

(30) Foreign Application Priority Data

Jul. 21, 2020 (BR) ...................... 10 2020 014856-7

(51) Int. Cl.
*B04C 5/103* (2006.01)
*B04C 5/30* (2006.01)
(Continued)

(52) U.S. Cl.
CPC ................ *B04C 5/103* (2013.01); *B04C 5/30* (2013.01); *B04C 9/00* (2013.01); *B04C 11/00* (2013.01); *B04C 2009/008* (2013.01)

(58) Field of Classification Search
CPC .. B04C 5/103; B04C 5/30; B04C 9/00; B04C 11/00; B04C 2009/008; B04C 5/18;
(Continued)

(56) References Cited

U.S. PATENT DOCUMENTS 5,643,537 A 7/1997 Raterman et al.
5,681,450 A 10/1997 Chitnis et al.
(Continued)

FOREIGN PATENT DOCUMENTS

BR PI0004613-2 A 3/2004
BR PI0204737-3 A 6/2004
(Continued)

*Primary Examiner* — Dung H Bui
(74) *Attorney, Agent, or Firm* — Morrison & Foerster LLP

(57) ABSTRACT

The present invention addresses to a third stage system with self-bleeding by means of the use of an internally or externally installed ejector with application in all multicyclone systems operating at positive pressure, whether for application in particulate abatement or protection systems of turbo-expanders or in industrial units that involve the need of recovering solid products carried by the process gas, aiming at eliminating the need for any additional separation systems using cyclones or filters to carry out the bleeding of the cyclone legs.

9 Claims, 6 Drawing Sheets

(51) Int. Cl.
*B04C 9/00* (2006.01)
*B04C 11/00* (2006.01)

(58) Field of Classification Search
CPC .... B04C 5/28; B04C 3/04; B04C 3/06; C10G 11/18; B01D 45/12
See application file for complete search history.

(56) References Cited

U.S. PATENT DOCUMENTS

| | | | | |
|---|---|---|---|---|
| 5,779,746 | A | 7/1998 | Buchanan et al. | |
| 6,042,717 | A * | 3/2000 | Radcliffe | C10G 11/18 208/158 |
| 6,093,310 | A * | 7/2000 | Swan | C10G 11/18 208/113 |
| 6,126,813 | A * | 10/2000 | Fersing | C10G 11/18 208/127 |
| 6,165,353 | A * | 12/2000 | Carpenter | C10G 11/18 422/207 |
| 6,387,247 | B1 * | 5/2002 | Chen | B01J 19/26 239/398 |
| 6,641,715 | B1 * | 11/2003 | Gauthier | C10G 11/18 208/78 |
| 6,656,344 | B1 * | 12/2003 | Rao | C10G 11/18 208/146 |
| 6,673,133 | B2 | 1/2004 | Sechrist et al. | |
| 6,797,026 | B2 | 9/2004 | Sechrist et al. | |
| 6,902,593 | B2 | 6/2005 | Miller et al. | |
| 7,081,229 | B2 | 7/2006 | Huziwara et al. | |
| 7,648,544 | B2 | 1/2010 | Dewitz et al. | |
| 8,287,613 | B2 | 10/2012 | Chen et al. | |
| 8,431,098 | B2 * | 4/2013 | Anderson | B01D 53/864 422/4 |
| 9,868,916 | B1 * | 1/2018 | Li | C10G 11/18 |
| 10,525,483 | B1 * | 1/2020 | Hill | B02C 19/0043 |
| 10,919,052 | B2 * | 2/2021 | Chuman | B04C 11/00 |
| 2002/0178703 | A1 * | 12/2002 | Ribera Salcedo | B04C 7/00 55/459.1 |
| 2004/0208801 | A1 * | 10/2004 | Huziwara | B01J 8/0055 422/139 |
| 2007/0213573 | A1 * | 9/2007 | Ross | B01J 8/0065 585/242 |
| 2009/0269260 | A1 * | 10/2009 | Liu | C10J 3/503 422/212 |
| 2011/0265342 | A1 * | 11/2011 | Shi | F26B 3/084 34/82 |
| 2012/0091037 | A1 * | 4/2012 | Feugnet | C10G 11/18 208/113 |
| 2013/0055936 | A1 * | 3/2013 | Vimalchand | F22B 1/22 110/297 |
| 2013/0137909 | A1 * | 5/2013 | Dean | C10G 35/04 585/324 |
| 2013/0145683 | A1 * | 6/2013 | Freel | B01J 8/1827 44/307 |
| 2014/0013999 | A1 * | 1/2014 | Goerlach-Doht | C08J 3/05 536/91 |
| 2015/0239992 | A1 * | 8/2015 | Goerlach-Doht | C08B 11/193 424/463 |
| 2015/0361362 | A1 * | 12/2015 | Daggupati | C10J 3/466 252/373 |
| 2016/0096159 | A1 * | 4/2016 | Black | C10G 11/187 239/562 |
| 2016/0115107 | A1 * | 4/2016 | Arjah | B01J 19/006 422/162 |
| 2018/0043292 | A1 * | 2/2018 | Carroll | B04C 5/06 |
| 2018/0045405 | A1 * | 2/2018 | Fitzsimmons | F23C 10/002 |
| 2018/0356329 | A1 * | 12/2018 | Wang | H04N 25/00 |
| 2019/0184309 | A1 * | 6/2019 | Nahtigal | B01D 11/0292 |
| 2019/0321833 | A1 * | 10/2019 | Lu | B04C 3/06 |
| 2020/0147866 | A1 * | 5/2020 | Van Egmond | B29C 64/232 |
| 2021/0261870 | A1 * | 8/2021 | Davydov | B01J 8/26 |
| 2021/0316241 | A1 * | 10/2021 | Scaife | B01D 45/16 |
| 2021/0331918 | A1 * | 10/2021 | Gupta | B01J 8/1827 |
| 2022/0275287 | A1 * | 9/2022 | Kashyap | C10G 11/18 |
| 2022/0380689 | A1 * | 12/2022 | Wang | B01D 53/83 |

FOREIGN PATENT DOCUMENTS

| | | | |
|---|---|---|---|
| CA | 1161374 | A | 1/1984 |
| GB | 2077631 | A | 12/1981 |
| WO | 0141934 | A1 | 6/2001 |

* cited by examiner

THIRD-STAGE SYSTEM WITH AUTOMATIC BLEEDING, AND USE THEREOF

CROSS-REFERENCE TO RELATED APPLICATIONS

This application is a national stage application, filed under 35 U.S.C. § 371, of PCT International Patent Application No. PCT/BR2021/050305, filed Jul. 19, 2021, and entitled "THIRD-STAGE SYSTEM WITH AUTOMATIC BLEEDING, AND USE THEREOF," and claims benefit of and priority to BR Application No. 10 2020 014856-7 filed Jul. 21, 2020, the disclosures of all of which are incorporated herein by reference in their entireties.

FIELD OF THE INVENTION

The present invention addresses to a third stage system with self-bleeding through the use of an internally or externally installed ejector with application in all multicyclone systems operating at positive pressure, whether for application in particulate abatement systems or protection of turbo-expanders or in industrial units involving the need of recovering solid products carried by the process gas, aiming at eliminating the need for any additional separation systems using cyclones or filters to carry out bleeding of the cyclone legs.

DESCRIPTION OF THE STATE OF THE ART

Currently, to meet the environmental requirements of particulate matter emissions into the environment and/or protection of turbo-expanders for electrical energy generation, the third stage cyclone systems in most fluidized catalytic cracking (FCC) units consist of multiple cyclones arranged in parallel inside a vessel, which operate at positive pressure, that is, the internal pressure of the cyclones is greater than that present inside the vessel where the collected catalyst is discharged, and due to the use of multiple cyclones with the collected catalyst being discharged in a diluted phase and without the use of a mobile mechanical sealing device on the cyclone legs, such as valves, the absence of which confers greater reliability, and for that, there is a need of operating these cyclones in a bleeding regime, that is, with continuous removal of gases along with the collected particulate, to prevent the re-entry of gases along with the particulate already collected in other legs, due to the fact that it is impossible to operate all cyclones with the same pressure differentials between the cyclone inlet and the top of their legs.

The need of operating the legs of the multiple third stage cyclones in a bleeding regime, with a bleed gas flow rate of the order of 2 to 5% of the feed gas flow rate, and with the gases carrying the catalyst already collected in the third stage cyclones, leads to the need for another cyclone to collect again the catalyst carried by this gas, causing a loss of efficiency in collecting as to the system, wherein it is estimated a loss of around 25 to 50%.

In addition, there is a loss of electrical energy generation capacity, as the gas stream removed by bleeding the cyclone legs will no longer be available for the generation of electrical energy in the turbo-expanders.

In all commercially known third stage cyclone systems, to ensure the sealing of the legs via bleeding (ensure good collection efficiency of the system), a global withdrawal of gases is adopted through the legs at a constant flow rate of the order of 3% of the combustion gas inlet flow, generally from 2 to 5%, in a controlled manner, generally using a critical orifice, and this bleed stream also has the function of pneumatically transporting the catalyst collected by the cyclones of the third stage system.

Patents U.S. Pat. Nos. 6,673,133 and 6,797,026 show the importance of bleed in cyclone efficiency, showing that varying bleed from 1% to 3% reduces emission by 45%, and reduces the cyclone cutting diameter from 6 μm to 5 μm; therefore, the need of using the bleed flow rate in the legs of multiple cyclones in third stage cyclone systems is undeniable. The drawback, however, is that a new separation system becomes necessary to separate the material collected by the third stage cyclones from the stream of gases from the bleed of the cyclone legs. For this purpose, an additional cyclone is usually installed, called the fourth stage of cyclones, due to its low cost of installation and maintenance, and the bleed gas after passing through the fourth stage, due to the kinetic energy present, consumed by the restriction orifice, passes through a boiler recovered from energy or carbon monoxide combustion when present, and then discharged to the atmosphere. As the collection efficiency of the fourth stage cyclone is not 100%, being around 90 to 95%, the latter ends up reducing the overall separation efficiency of the set, since all the solid material collected has to be separated again.

Depending on the granulometry of the input material and the concentration of catalyst in the gases, the collection efficiency of the third stage cyclones is in the order of 80 to 90%, while the collection efficiency of the fourth stage cyclone is 92 to 98%. These numbers indicate that 25% of the material emitted to the atmosphere by third stage cyclone systems would come from the fourth stage cyclone, although in more extreme cases it could be up to 50%.

Another solution, which substantially eliminates these losses, but with a high installation and operating cost, is the installation of sintered filters "with retro-cleaning" for the treatment of the bleed stream of the third stage system, instead of a fourth stage cyclone, subject to deficiency in the collection of particulate matter or catalyst. However, this solution still entails a loss of 2 to 5% of electrical energy generation in the turbo-expanders due to the fact that there is still the disposal of the bleed gas flow rate from the legs of the third stage cyclones to the atmosphere.

There are configurations in which the simple containment of the internal vortex is sufficient to guarantee the sealing, but this is impossible, due to differences between the pressure differentials in the cyclones, and, in addition, the catalyst that comes out of these cyclones are carried by gases, which, if not bled, will return into the cyclone via the catalyst outlet, carrying part of the already collected catalyst and reducing the separation efficiency.

The inventions U.S. Pat. Nos. 5,643,537 and 5,779,746 show the concern to discharge the catalyst collected in the cyclones by limiting the length of the vortex using tangential slots for the discharge of the catalyst together with bleed gas and closing the base of the cyclone. Studies show that part of the bleed flow rate, with the penalty of being concentrated in catalyst because it is in the catalyst discharge region, tends to return to the interior of the cyclones through the tangential slots.

The inventions U.S. Pat. Nos. 5,681,450 and 6,902,593 try to correct the problem of bleed gas return through the tangential slots, using a closed termination with tangential slots for the catalyst discharge along with the bleed gas flow rate, and allowing part of the bleed flow rate to recycle into the interior of the third stage cyclones, readmitting the gases with catalyst to the low pressure internal vortex zone in the central region below the tangential outlet of the collected catalyst, that is, implying a loss of efficiency due to the use of the closed termination with slots to limit the inner and outer vortex, and by recycling the bleed flow with collected catalyst back to the inner vortex of the cyclone. There is no control over this bleed flow rate, defined by the pressure differential of the vessel versus the pressure at the apex of the internal vortex; however, in the third stage system additional bleeding is still necessary. However, the accumulation of catalyst at the bottom of the cyclone due to the use of a closed lid and tangential slots has not yet been fully resolved.

The inventions U.S. Pat. Nos. 7,648,544 and 8,287,613 solve the problem with the accumulation of catalyst, by leaving the external vortex free, which carries the separate catalyst and uses an internal vortex limiter, which has the option of returning part of the flow rate from bleeding the cyclones through the hollow central part of the internal vortex limiter, with the penalty of it being concentrated in catalyst as it is in the discharge region of the external vortex concentrated in catalyst. However, the need for bleed flow rate to the atmosphere continues.

The invention WO0141934 recycles the purified gas from the cyclone, passing through a second unidirectional type cyclone, without flow reversal, wherein the particulate material collected together with a percentage of the gas flow rate is fed back into the cyclone inlet.

The invention U.S. Pat. No. 7,081,229 bleeds the leg of a negative pressure cyclone, a cyclone with an internal pressure lower than that of the vessel where the cyclone is installed, using an ejector connected to the cyclone leg to overcome the pressure difference between the vessel and the cyclone, and discharging the bleed stream along with the motive fluid of the ejector into the vessel.

The invention PI00046132 fully recycles the material collected in the leg of a second stage cyclone via a pipe connected to its leg, being a negative pressure cyclone having an internal pressure lower than that of the vessel in which it is installed, together with a percentage of gas, that is, bleeding the leg of the second stage cyclone, and feeding back into the inlet of the first stage cyclone with or without the presence of an additional cyclone to separate part of the catalyst collected in the second stage, which is a positive pressure cyclone in relation to the vessel where the first and second stage cyclones are installed. The objective of the patent application is to increase the separation efficiency by avoiding the use of mechanical sealing devices, like valves, in the second stage cyclone leg, a negative pressure cyclone, which is due to the presence of leakage when using valve and the absence of permanent bleeding. This is different from the current proposal, in which there is no physical interconnection of the cyclone legs, and the cyclone bleeding is carried out indirectly, via gas extraction from the upper part or roof of the vessel where the cyclone is installed, where the concentration is diluted in the catalyst collected from the diluted cyclone leg.

Document GB2077631 discloses a modified form of gas/particle separation unit in the third stage for separating used catalyst particles from the gas discharged from a catalyst regenerator vessel in a fluidized catalytic cracking unit for petroleum refining. However, document GB2077631 avoids the use of gas bleeding and is not based on proposing the use of cyclones in a bleeding regime without the need for any additional separation systems using cyclones or filters to carry out bleeding of the cyclone legs.

Document CA1161374 refers to an improved method and apparatus for separating particles from gases by using centrifugal separators. Such an apparatus is particularly useful for separating catalyst particles from hydrocarbon vapors from a catalytic cracking process and can also be used to advantage in other applications, such as the removal of suspended solids from gases fed to boilers resulting from gasification and coal liquefaction, molecular separation and for use with supercharged boilers. However, document CA1161374 refers to centrifugal separators for separating gas particles and does not address to the need for an additional abatement system for treating the bleed stream from the legs of third stage cyclones.

Document PI02047373 discloses an improved cyclonic system to separate solid and gaseous particles in fluidized catalytic cracking (FCC) processes with reduced coke formation in the separator vessel without favoring the carrying of the separated catalyst. More specifically, it addresses to a closed unconfined system for the cyclonic separation between solid particles (catalyst) and effluent gases from the rising reactor ("riser") in FCC processes, where the process of removing hydrocarbons remaining in the separator vessel is optimized, without loss of separation efficiency, thus minimizing coke deposition along the same. However, PI02047373 teaches legless cyclones and does not address to a third stage system with bleeding regime.

In order to solve such problems, the present invention was developed, by means of the use of an ejector preferably installed internally, or externally because with the benefit of the simplicity of installation, it will recirculate or recycle a flow rate of the order of 3% of the region of the top of the vessel, a region of low or diluted concentration of catalyst, where the third stage cyclones are installed for the gas feed duct, carrying catalyst from the region with diluted catalyst of the third stage system, thus avoiding the need for investment in additional abatement systems for treating the bleed stream from the legs of third stage cyclones.

The present invention also makes use of vortex limiters, of use and effectiveness enshrined in the technical literature to contain the internal vortex inside the cyclone, reducing catalyst re-carrying and the pressure differential between the inlet and the top of the cyclone leg.

No document of the state of the art discloses a system capable of eliminating the need for any additional separation systems using cyclones or filters to carry out bleeding of the cyclone legs, such as that of the present invention.

As can be seen, the present invention brings the benefit of reducing the cost of installing and operating additional abatement systems to comply with environmental legislation, thus eliminating the fourth stage of cyclones or filters, which always lead to operational and maintenance problems. In addition, it allows the refiner to adjust the bleed percentage depending on the emissions result, seeking at maximum separation efficiency, something that is not possible in configurations with the fourth stage cyclone and critical FO. There are no restrictions on the practice of bleeding percentage, only for cases where there is restriction due to erosive aspects of the cyclone.

Another advantage is that there is an increase in the electrical energy generation capacity in the existing turbo-expanders in the FCC units, as it is an internal recycle, it avoids the continuous diversion of 2-3% of the gas flow rate through the fourth stage cyclone, which allows all of the combustion gases to pass through the turbo-expander, with a consequent increase in energy generation, as well as an increase in the collection efficiency of the third stage systems, reducing the emission of particulates into the atmosphere.

BRIEF DESCRIPTION OF THE INVENTION

The present invention addresses to an additional abatement system for the treatment of the bleed stream from the legs of the third stage cyclones, through the use of an ejector preferably installed internally, or externally, since with the benefit of the simplicity of installation, it will recirculate or recycle a flow rate of around 3% from the region at the top of the vessel, a region of low concentration or diluted catalyst, where the third stage cyclones are installed to the gas feed duct, carrying catalyst from the diluted catalyst region of the system of third stage.

The invention also makes use of vortex limiters, used to contain the internal vortex inside the cyclone, reducing the catalyst readjustment and the pressure differential between the inlet and the top of the cyclone leg.

BRIEF DESCRIPTION OF THE DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

The present invention through the use of ejector (13) preferably installed internally or externally to the vessel (6) has a simplicity of installation, in which it will recirculate or recycle a flow rate of the order of 3% of the region of the top of the vessel, a region of low or diluted catalyst concentration, where the third stage cyclones are installed for the gas feed duct, carrying catalyst from the diluted catalyst region of the third stage system.

The invention also makes use of vortex limiters, to contain the internal vortex inside the cyclone, reducing catalyst carrying and pressure differential between the inlet and the top of the cyclone leg.

Figure 1:
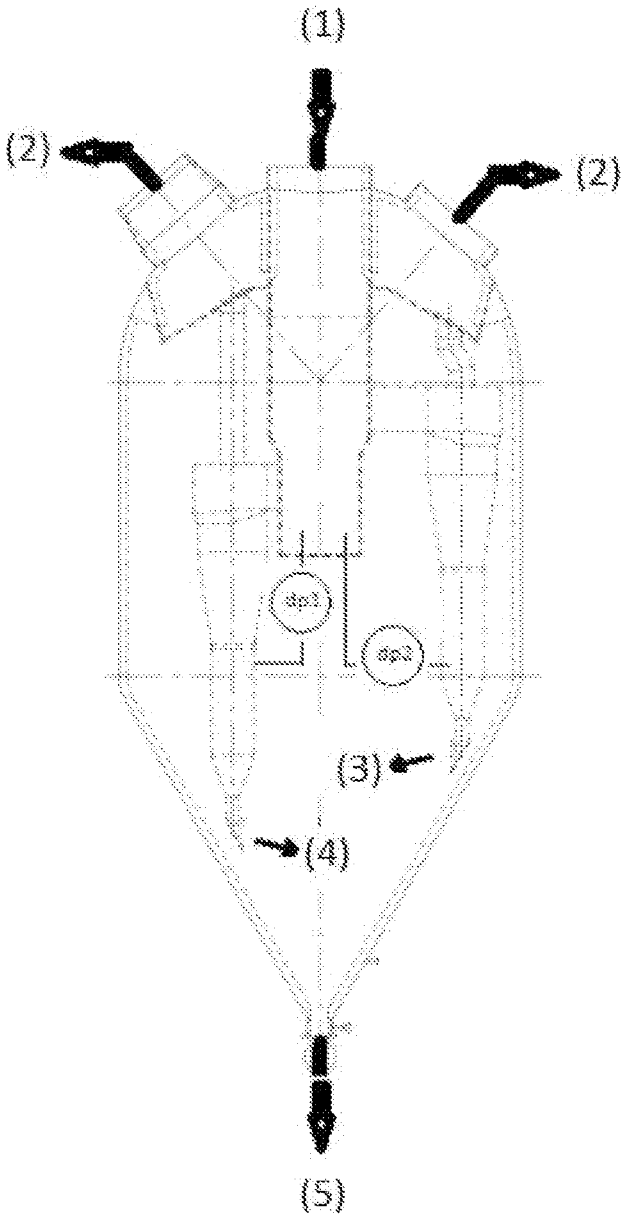
FIG. 1 illustrating a third stage system vessel with multiple cyclones in parallel, represented by: catalyst gas feed (1), purified gas or little catalyst output (2), catalyst and bleed gas (3), catalyst and bleed gas (4), separate catalyst+carrier or bleed gas output (5) and, dp1 and dp2 are the pressure differentials, dp1 being different from dp2.
Figure 2:
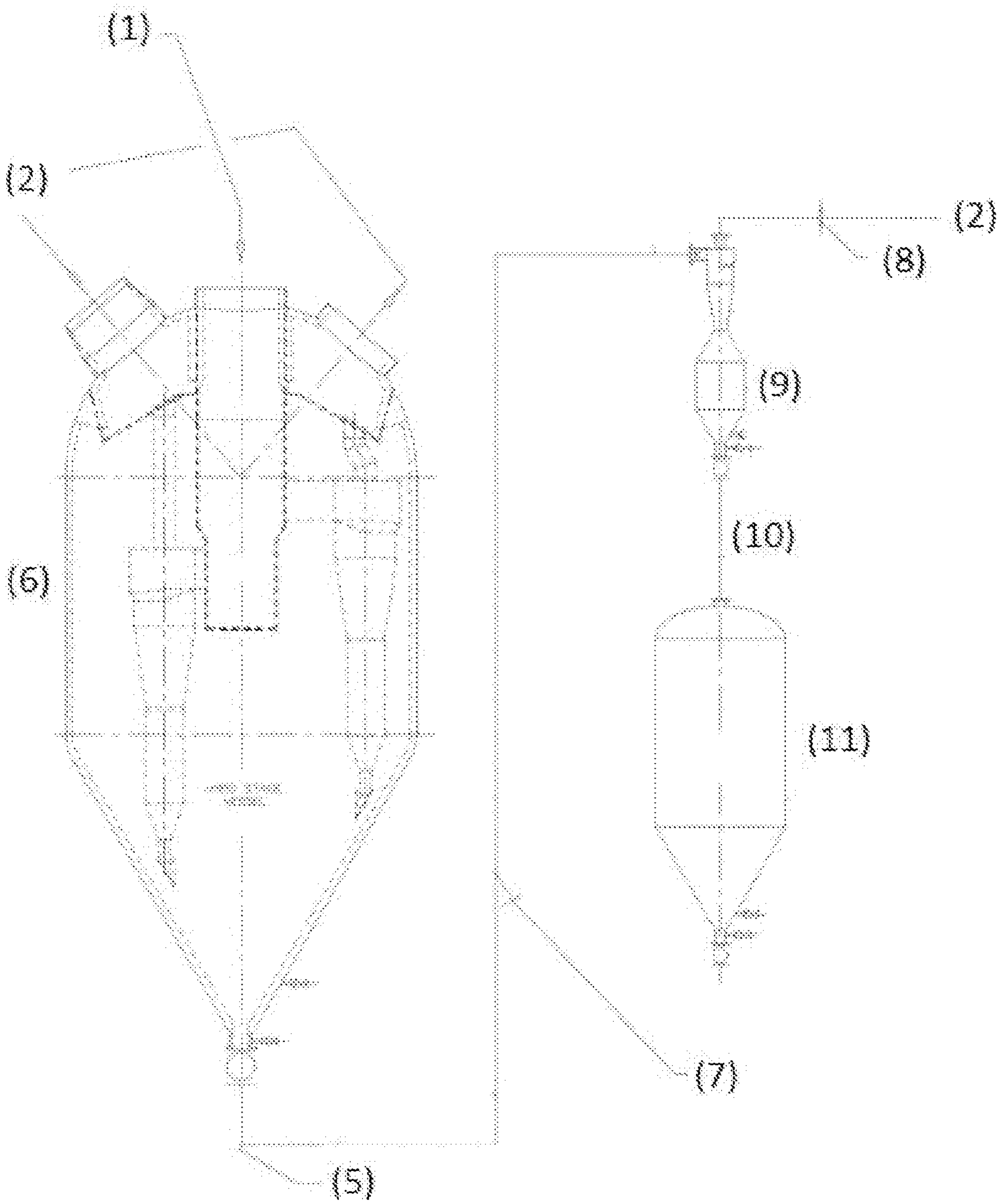
FIG. 2 is illustrating a complete third and fourth stage cyclone system, typical of the state of the art, with perfect alignment to bleed the cyclones, represented by: catalyst gas feed (1), purified gas or little catalyst output (2), which is sent to the turbo-expanders for electric energy generation or for the recovery of thermal energy and or carbon monoxide burning, separate catalyst+carrier or bleed gas output (5), third stage cyclone vessel (6), pneumatic carrying auxiliary air of the catalyst (7), restriction orifice (8), fourth stage cyclone (9), collected catalyst outlet (10), catalyst accumulation silo (11)
Figure 3:
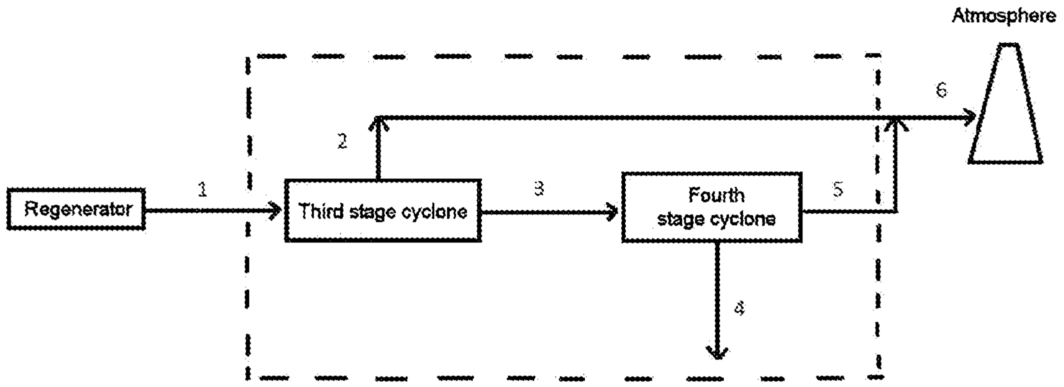
FIG. 3 is illustrating a typical state-of-the-art system, where it shows a mass balance of the main systems, considering the performance of a Third and Fourth Stage Cyclone System working with 84% global collection efficiency, consisting of a third stage cyclone running at 88% collection efficiency and a fourth stage cyclone running at 95% collection efficiency. Thus, the inlet flow rate of the catalyst gas (1), coming from the regenerator output, and the other streams represented by 2, 3, 4, 5 and 6, are 25 kg/h, 3 kg/h, 22 kg/h, 21 kg/h, 1 kg/h and 4 kg/h, respectively. There can be seen a 25% increase in atmospheric emission due to the presence of the fourth stage cyclones, since the emission into the atmosphere of the third stage alone is 3 kg/h, while with the presence of the fourth stage it becomes 4 kg/h, due to the addition of 1 kg/h.
Figure 4:
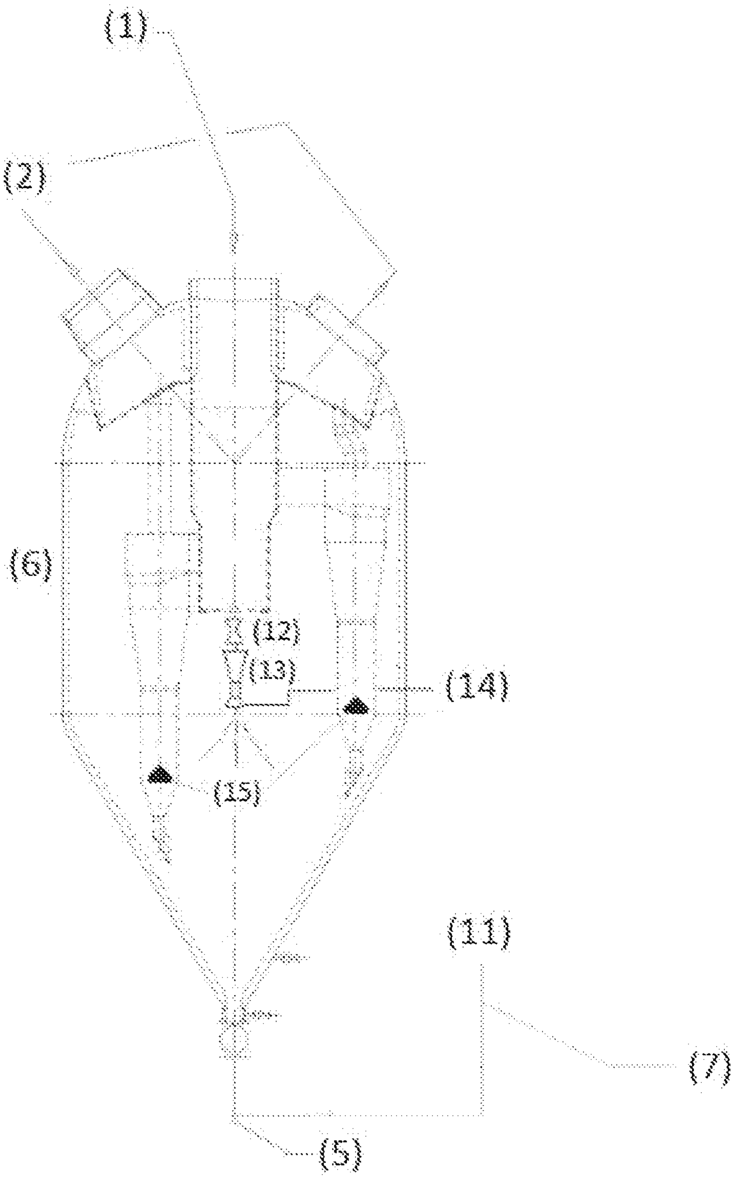
FIG. 4 is illustrating a third stage cyclone system with the ejector (13) internal to the vessel (6), whose purpose is to bleed the multiple third stage cyclones via recycle of the gas and catalyst present in the upper region of the third stage cyclone vessel (6). In this configuration, the ejector is positioned parallel to the cyclones and its output is feeding the bleed gas at the lower part or base of the distribution duct for the feeds of the gas-catalyst stream to the multiple cyclones in parallel, in a region after the inlets of the multiple cyclones operating in parallel. The set configuration is given by: catalyst gas feed (1), purified gas or little catalyst output (2) which is sent to the turbo-expanders for electrical energy generation, separate catalyst+carrier or bleed gas output (5), third stage cyclone vessel (6), pneumatic carrying auxiliary air of the catalyst (7), catalyst accumulation silo (11), Venturi type flow meter (12), optional, ejector (13), motive fluid of the ejector (14), vortex limiter (15), optional.
Figure 5:
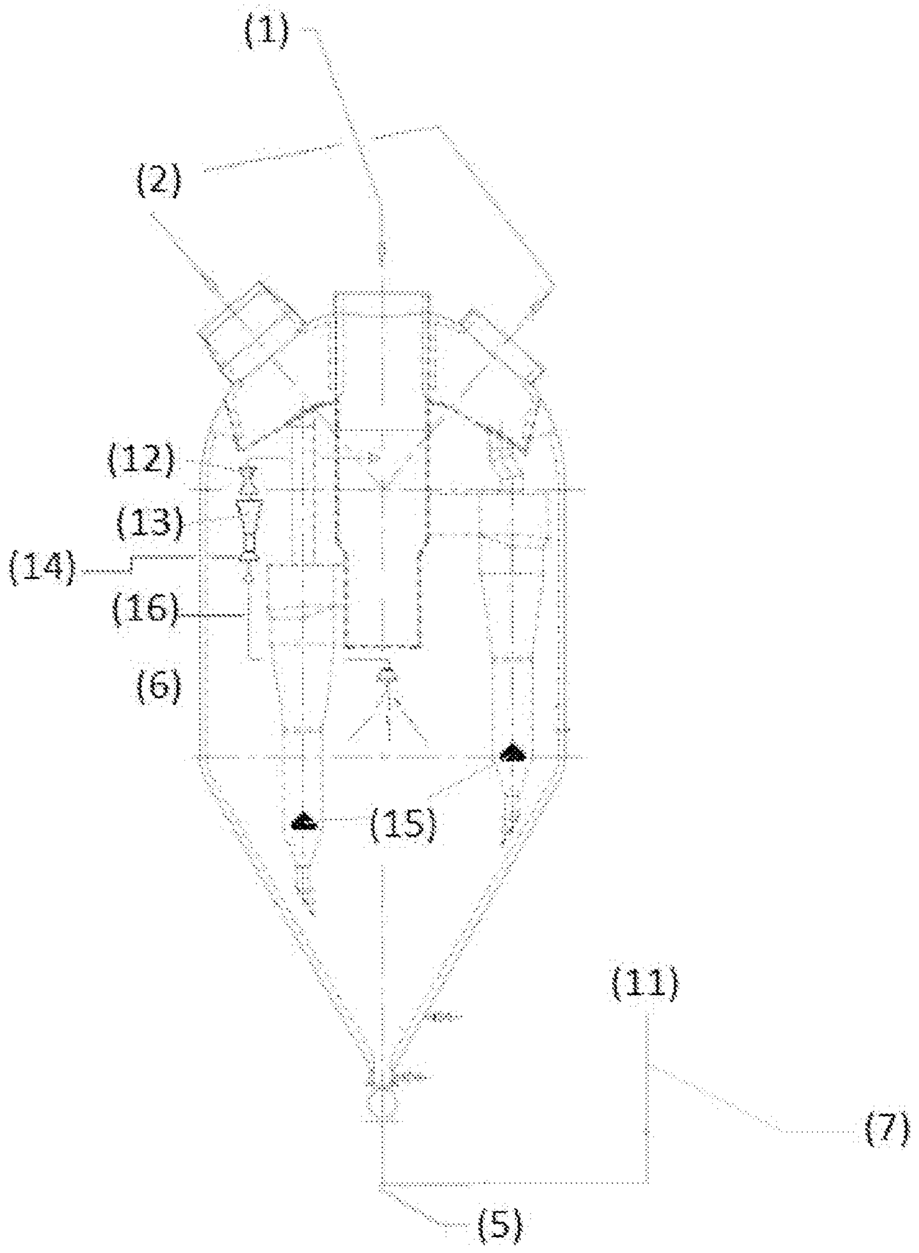
FIG. 5 is illustrating a third stage cyclone system with the ejector internal to the vessel (6) with the same objective of bleeding the multiple third stage cyclones via recycle of the gas and catalyst present in the upper region of the third stage cyclone vessel (6). In this position, the ejector (6) is inserted internally to the vessel (6) and external to the cyclones and its output is feeding the bleed gas at the upper part in the distribution duct, inlet of the catalyst gas stream to the multiple cyclones connected in parallel, in a region before the inlets of multiple cyclones. The set configuration is given by: catalyst gas feed (1), purified gas or little catalyst output (2) that is sent to the turbo-expanders for electrical energy generation, separate catalyst+carrier or bleed gas output (5), pneumatic carrying auxiliary air of the catalyst (7), catalyst accumulation silo (11), Venturi type flow meter (12), optional, ejector (13), motive fluid of the ejector (14), vortex limiter (15), optional, auxiliary piping (16)
Figure 6:
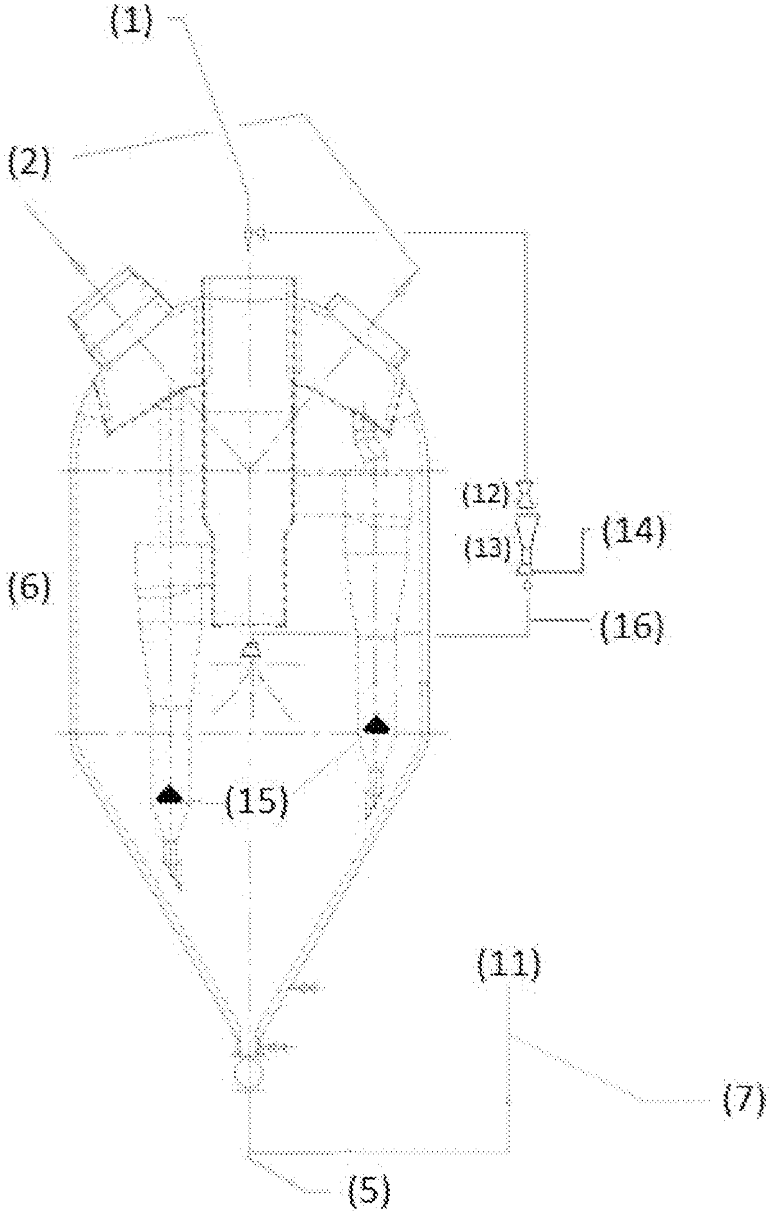
FIG. 6 is illustrating a third stage cyclone system with the ejector external to the vessel (6), with the same objective of bleeding the multiple third stage cyclones via recycle of the gas and catalyst present in the upper region of the third stage cyclone vessel (6). In this configuration, the ejector is positioned externally to the vessel (6) and its outlet is feeding the bleed gas into the distribution duct for the feeds of the catalyst gas stream (1) to the multiple cyclones that operate in parallel. The configuration of the set is given by: catalyst gas feed (1), purified gas or little catalyst output (2), which is sent to the turbo-expanders for electrical energy generation, separate catalyst+carrier or bleed gas output (5), third stage cyclone vessel (6), pneumatic carrying auxiliary air of the catalyst (7), catalyst accumulation silo (11), Venturi type flow meter (12), optional, ejector (13), motive fluid of the ejector (14), vortex limiter (15), optional, auxiliary piping (16). There is no connection to the fourth stage cyclone.

The internal or external ejector (13), as shown in FIGS. 4, 5, and 6, respectively, through the action of the motive fluid (14), manages to displace the bleeding stream from a point of lower pressure (inside the vessel (6), region where the multiple cyclones discharge the stream concentrated in particulate matter and bleed gas) to a higher pressure point (inlet of the feed of the multiple third stage cyclones of the vessel (6)). This stream mixes with the main flow of gases coming from the regenerator and re-enters the third stage cyclones, which become responsible for removing the particles present in the same, completely eliminating the need for a fourth stage cyclone. And due to the effect of carrying/capturing the small particles in the form of clusters (agglomerates of fine and coarse particles) within the multiple cyclones due to mixing with the stream from the regenerator, which has a coarser granulometric profile, of the order of 4 times, a phenomenon recognized in the state of the art as capture of fine particles by coarse particles; therefore, the impact on the emission of particulate matter due to the recycle of the bleed stream of the cyclones at the vessel outlet with the third stage cyclones is extremely low, compared to the impact of the presence of the fourth stage cyclone; in addition, the bleeding stream from the upper region of the vessel (6) with fine catalyst is difficult to separate, when treated alone.

The flow rate of the bleed stream at the outlet of the ejector (13) depends on the flow rate of the motive fluid in the ejector (14), which is adjusted from the measurement of the aspirated flow rate, which can be known through the installation of an instrument for measuring flow rate of the Venturi type (12), optional, between the third stage vessel (6) and the ejector (13) or even at the ejector outlet in the case of internal installation. It is recommended that both the Venturi (12) and the recycle ejector (13) be built with ceramic internal parts, resistant to the abrasion of the catalyst particles. The motive fluid flow rate (14) to the recycle ejector must be increased until the flow rate measurement of the aspirated stream is at the desired value, usually from 2 to 5% of the gas flow rate that enters the third stage vessel (6). The presence of the vortex limiter (15) also allows the operation of excessive bleeding, as it limits the penetration of the internal vortex at the top of the leg of the multicyclones. It is important to point out that, in this configuration, both the energy present in the bleed stream and in the motive fluid of the ejector will be available for the generation of electrical energy in the turbo-expander.

Therefore, there is no longer a restriction on the bleed flow rate of the legs of the second stage cyclones regarding the loss of electrical energy generation capacity.

The self-bleeding third stage system according to the present invention and illustrated in FIG. 4 comprises an internal ejector (13) in which the suction side is connected to the diluted phase in the central region of the third stage cyclone vessel (6) and its discharge connected to the central inlet/feed of the third stage cyclone, where it mixes with the main flow of gases from the regenerator and re-enters the third stage cyclone and an instrument for measuring flow rate of the Venturi type (12), optional, installed on the ejector outlet (13).

As can be seen in FIG. 5, a second embodiment of the present invention, in which the third stage system comprises an internal ejector (13) located on the side of the top of the third stage cyclone vessel (6), in which it has the suction side connected to the diluted phase in the central region of the third stage cyclone vessel (6), via an auxiliary piping (16) and its discharge connected to an interconnection piping to the third stage cyclone, where it mixes with the main flow of gases from the regenerator and re-enters the third stage cyclone. There is also an instrument for measuring flow rate of the Venturi type (12), optional, installed at the ejector outlet (13).

As can be seen in FIG. 6, a third embodiment of the present invention, in which the third stage system comprises an external ejector (13) located on the side of the top of the third stage cyclone vessel (6), in which it has the suction side connected with the diluted phase in the central region of the third stage cyclone vessel (6), via an auxiliary piping (16) and its discharge interconnected with the catalyst gas feed piping (1) and an optional Venturi type flow meter (12) coupled to the ejector outlet (13).

The motive fluid of the ejector (14) depending on whether the combustion gas is flammable or not, may be: air, fuel gas, natural gas or steam.

Optionally, the vortex limiter (15) can be installed in the top region of the cyclone leg in all embodiments of the present invention, to increase collection efficiency, reduce erosion at the top of the leg of the multicyclones of the Third Stage Cyclone System and reduce motive fluid consumption (14).

It should be noted that, although the present invention has been described in relation to the attached drawings, it may undergo modifications and adaptations by technicians skilled on the subject, depending on the specific situation, but provided that within the inventive scope defined herein.

The invention claimed is:

1. A third stage system with self-bleeding, wherein the third stage system comprises:

- a third stage cyclone vessel comprising a top and a bottom, wherein the top of the third stage cyclone vessel comprises central feed piping and multiple purified gas outputs and the bottom of the third stage cyclone vessel comprises a bleed gas output; and
- a recycle ejector where a suction side of the recycle ejector is directly connected to a central region or a top region of the third stage cyclone vessel via an auxiliary piping to aspirate a stream of the third stage cyclone vessel and a discharge of the recycle ejector is connected to the central feed piping in the top of the third stage cyclone vessel wherein multiple cyclones are positioned within the third stage cyclone vessel, and wherein the multiple cyclones receive the central feed of the third stage cyclone vessel.

2. The third stage system with self-bleeding according to claim 1, wherein the third stage system further comprises a flow meter, which is coupled to an ejector output, in which the recycle ejector uses a motive fluid stream variable accordingly.

3. The third stage system with self-bleeding according to claim 1, wherein the third stage system further comprises a vortex limiter installed in a top region of a cyclone leg.

4. The third stage system with self-bleeding according to claim 2, wherein the recycle ejector is internally or externally installed in the third stage cyclone vessel.

5. The third stage system with self-bleeding according to claim 2, wherein a flow rate of motive fluid of the recycle ejector promotes the aspiration of a stream flow rate in the range of 2 to 5% in relation to the flow rate of the gases that enter the third stage cyclone vessel, wherein a restriction for a maximum value of flow rate of the stream to be aspirated is due to excessive consumption of motive fluid or erosive aspects.

6. The third stage system with self-bleeding according to claim 2, wherein the motive fluid of the recycle ejector is air, fuel gas, natural gas or steam.

7. The third stage system with self-bleeding according to claim 2, wherein the flow meter is of a Venturi type.

8. The third stage system with self-bleeding according to claim 2, wherein the flow meter and the recycle ejector are built with ceramic internal parts.

9. A use of the third stage system as defined in claim 1, wherein the third stage system is applied in multicyclone systems operating at positive pressure, particulate abatement systems, turbo-expander protection systems and in industrial units involving recovering solid products carried by the process gas.

* * * * *